Figure 2:
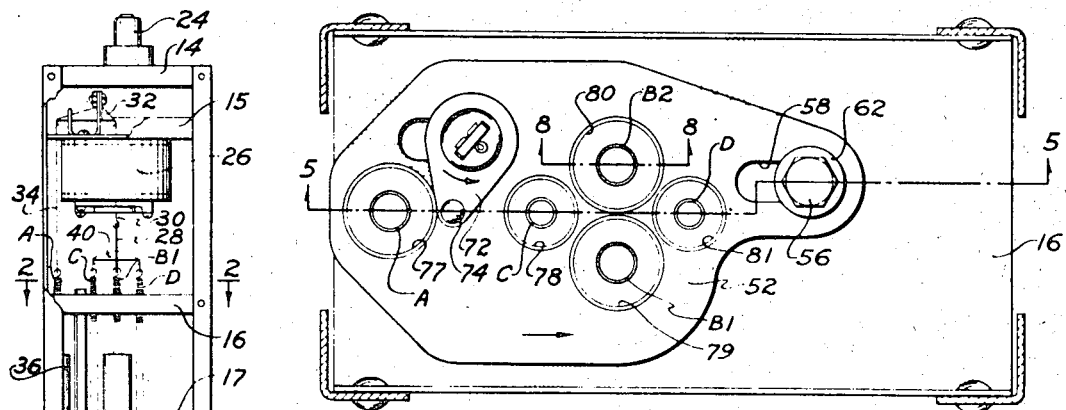

Aug. 13, 1940.                L. HAMMOND                2,211,205
                        REVERBERATION APPARATUS
                        Filed Oct. 7, 1939            2 Sheets-Sheet 1

Inventor
Laurens Hammond
By
Atty.

Aug. 13, 1940.                L. HAMMOND                 2,211,205
                        REVERBERATION APPARATUS
                        Filed Oct. 7, 1939         2 Sheets-Sheet 2
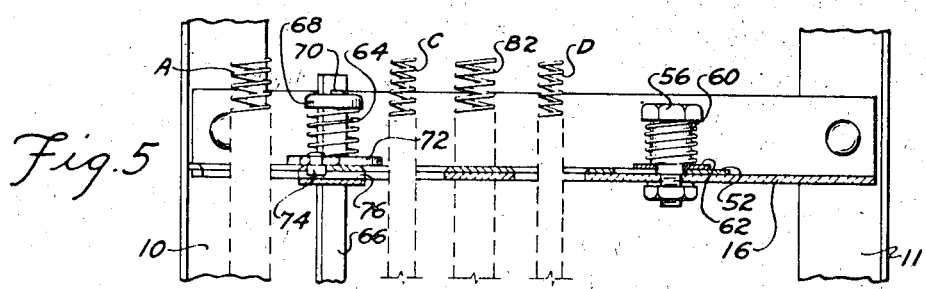
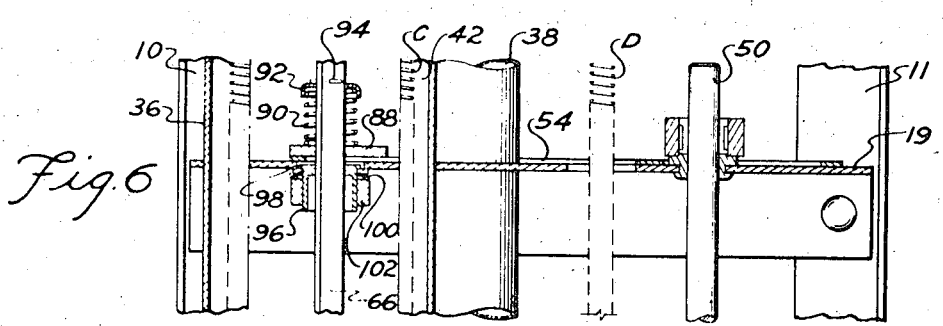
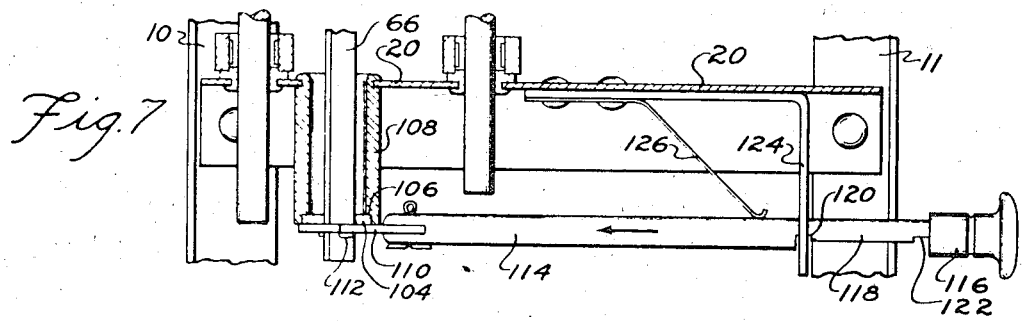
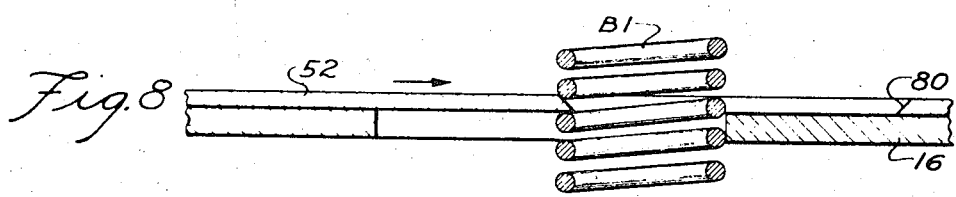
Inventor
Laurens Hammond
By
Atty.

Patented Aug. 13, 1940

2,211,205

UNITED STATES PATENT OFFICE 2,211,205

REVERBERATION APPARATUS

Laurens Hammond, Chicago, Ill.

Application October 7, 1939, Serial No. 298,366

9 Claims. (Cl. 181—0.5)

My invention relates generally to reverberation apparatus such as that disclosed in my co-pending application, Serial No. 284,761, filed July 15, 1939, and more particularly to a protective locking apparatus for holding the parts therein in position when the apparatus is being shipped or moved about.

In the apparatus more fully disclosed in the aforesaid application, there are a number of relatively long coil springs utilized to transmit sound vibrations from an electro-mechanical transducer to a mechanico-electric transducer, the system providing several points at which the vibrations traveling through the springs are reflected and other points at which the vibrations are damped, so that the over-all result of the transmission of the sound through this coil spring system is the introduction of a reverberation effect of the signal transmitted.

In this apparatus the relatively long coil springs are preferably under slight tension and are supported by levers. These supporting levers are preferably made as light in weight as is compatible with their necessary strength to support the springs. The factor of safety employed in the design of these supports for the springs is therefore made very low since, if the supports were of large mass, they would introduce an undesirable effect in the transmission of the signal vibrations through the spring system. Thus, if the spring supports are subjected to any forces greater than those encountered in the normal use of the apparatus, such forces might readily strain the supports beyond their elastic limits and thus deform or break them. The springs have considerable mass and they therefore transmit excessive forces to their supports if they are subjected to a sudden shock, due to their relatively great momentum or inertia.

It is thus an object of the present invention to provide means for optionally locking the ends of the sound wave transmitting coil springs of a reverberation apparatus so as to prevent transmission of destructively large forces to the spring supports.

A further object is to provide an improved locking means for the sound transmitting springs of a reverberation apparatus, which is simple in construction, is easily operated, which will not damage the springs, which will not interfere with the operation of the apparatus when in unlocked position, and which can be economically manufactured.

Figure 3:
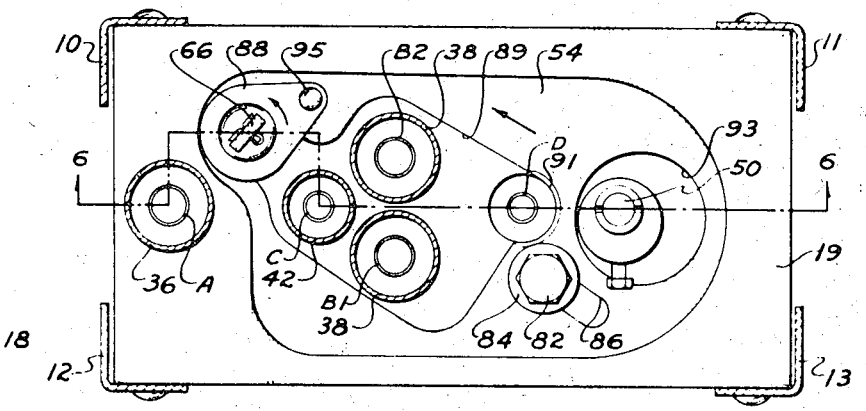
Figures 1, 4:
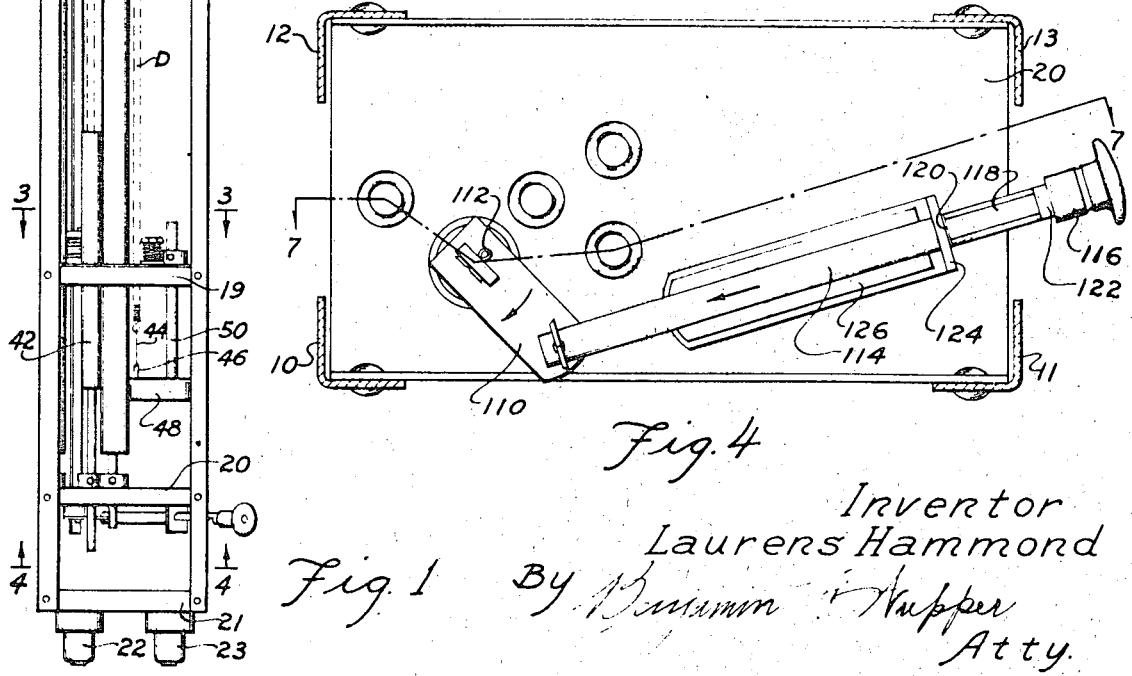

Other objects will appear from the following description, reference being had to the accompanying drawings in which:

Fig. 1 is a side elevational view of the apparatus, a portion thereof being broken away to show the operating parts more clearly;

Figs. 2, 3 and 4 are enlarged transverse sectional views taken on the lines 2—2, 3—3 and 4—4 respectively of Fig. 1;

Figs. 5, 6 and 7 are vertical sectional views taken on the lines 5—5, 6—6, and 7—7 respectively of Figs. 2, 3 and 4;

Fig. 8 is an enlarged fragmentary sectional view illustrating the manner of the engagement of the locking plate with one of the coil springs.

As shown in Figs. 1 to 4 inclusive, the reverberation apparatus comprises a frame composed of four upright angles 10, 11, 12 and 13, which are secured together by means of flanged plates or shelves 14 to 21 inclusive, these shelves being riveted or bolted to the vertical angles 10 to 13. The apparatus is adapted to be supported by rubber cushion supports 22, 23 and 24 so as to be substantially insulated against minor vibrations from the apparatus to which it may be attached.

As more fully disclosed in the aforesaid application, an electro-mechanical transducer 26 is secured to the shelf 15. This transducer may be similar in construction to the motor portion of a loud speaker. Instead of actuating a diaphragm as in the loud speaker, the vibrations generated by the moving voice coil of the speaker are transmitted to a stirrup 28 through a wire 30, the wire 30 being secured to the voice coil carrying spider and having its upper end secured to the end of a freely pivoted lever 32.

A spring A is secured to the other end of the lever 32 by means of a wire 34, the spring A depending into a tube 36 which is suitably supported from the shelf 20 and extends through apertures in the plates 17, 18 and 19. The lower end of the spring A is anchored adjacent the bottom of the tube 36, and the latter is substantially completely filled with a liquid such as light oil, so that vibrations transmitted to the spring A are damped. The stirrup 28 serves as a support for a pair of damping springs B1 and B2, which project downwardly into tubes 38 which are likewise substantially filled with oil and are supported in a manner similar to that in which the tube 36 is supported. These springs B1 and B2 are likewise anchored at the lower ends of the tubes 38, and thus serve as dampers to improve the frequency response characteristics of the apparatus as a whole.

A lever 40 is pivotally secured to the stirrup 28 and has springs C and D secured to the respective ends thereof. The lower extremity of the spring C is anchored within a tube 42 which contains a damping liquid immersing the lower end portion of the spring C. The lower end of the spring D is secured by a strap 44 with a hook 46 forming part of a mechanico-electric transducer 48. This transducer may be any suitable crystal, capacity, or other high mechanical impedance pick-up, and is supported by a rod 50, the latter being secured to the shelf 19 in a manner permitting vertical adjustment of its position.

The springs A, B1, B2, C and D are relatively long and are preferably under slight tension. The supports for the springs such as the levers 32 and 40 and the stirrup 28 are therefore stressed close to the elastic limit of the material of which they are made (allowing a small factor of safety), because these parts should be of as small mass as possible in order to obtain the proper sound vibration transmitting characteristics of the system as a whole. Because of the fact that the supports for the springs are thus made relatively fragile, they would be susceptible to deformation and breakage during shipment or rapid movement of the apparatus, were not the locking means of the present invention provided to prevent the transmission of forces due to shock from the springs to their supports.

The means for locking the springs to prevent the spring supports from being subjected to excessive strains comprises a pair of locking plates 52 and 54. The locking plate 52 is mounted for sliding movement above the shelf 16, being guided for substantially rectilinear movement by a shouldered bolt 56 which is secured to the shelf 16 and projects through a slot 58 formed in the plate 52. The locking plate 52 is maintained in contact with the plate 16 by a coil spring 60 which is compressed between the head of the bolt 56, and a washer 62 which rests upon the plate 52. The other end of the locking plate 52 is held in engagement with the top surface of the shelf 16 by a coil spring 64 which surrounds an actuating bar 66 and is compressed between a cupped washer 68, which is held against upward movement on the actuating bar 66 by a pin 70, and an arm 72 which has a slot for receiving the bar 66.

The end of the arm 72 is pivotally connected with the plate 52 by a shouldered rivet 74, the lower end of which projects through a suitable hole in the plate 62. The shelf 16 may have a groove formed therein for the end of the rivet 74 as shown by the deformation 76 in Figure 5. The locking plate 52 has a plurality of circular openings 77 to 81 inclusive through which the springs A, C, B1, B2 and D pass freely, and which register with corresponding openings formed in the plate 16. The edges of the openings 77 to 81 inclusive are beveled as best shown in Fig. 5, so that when the locking plate 52 is moved in the direction of the arrow (Fig. 2), the beveled edges surrounding these openings will engage the spring in the manner illustrated in Fig. 8.

From Fig. 8 it will be noted that as the locking plate 52 is shifted in the direction of the arrow, the beveled edge surrounding its opening 80 will engage the coils of the spring B1, and flex the spring sidewardly until the diametrically opposite portions of the spring coils engage the wall of the registering opening in the shelf 16, whereupon the bevel edge will wedge between successive coils of the spring B1, and thus clamp the spring sufficiently tightly to prevent the transmission of any appreciable force through the portion of the spring thus locked. The illustration of Fig. 8 is representative of the manner in which all of the springs are held by the locking plate when it is moved to locking position.

The locking plate 54 is guided for sliding movement with respect to the shelf 19 by a shouldered bolt 82 which is similar in construction to the bolt 56 and is provided with a spring pressed washer 84, the bolt extending through an elongated slot 86 in the plate 54. The plate 54 is moved by means of an arm 88 which is slotted to receive the actuating bar 66 and is pressed downwardly to hold the plate 54 in engagement with the shelf 19 by a coil spring 90, which is compressed between a cupped washer 92 held by a pin 94 and the arm 88. The plate 54 is pivotally connected to the arm 88 by means of a rivet 95, similar to the rivet 74 shown in Fig. 5.

Plate 54 serves as a means to clamp the lower end of the spring D only, since the lower ends of the other springs are anchored in the tubes into which they extend. The locking plate 54 is therefore suitably conformed with an enlarged opening 89, which embraces the tubes 38 and 42, one edge 91 of said opening 89 being beveled so as to be capable of engaging between successive turns of the coil spring D and thus clamp the latter against movement. The plate 54 is also provided with an enlarged circular hole 93 which surrounds the adjustable securing means for the pick-up supporting rod 50.

The actuating bar 66 is provided with a bearing supported on the shelf 19, this bearing consisting of a sleeve 96 having a flange 98 resting in a complementary depression formed in the shelf 19, the sleeve 96 being resiliently held in position by a spring washer 100 which is compressed between the depressed portion of the shelf 19 and a collar 102 which is pressed over the sleeve 96.

The lower end of the actuating bar 66 extends through a suitable slot formed in a bearing disc 104, which is rotatable in an annular internal groove 106 formed at the lower end of a bearing sleeve 108, the latter being peened to the shelf 20. An arm 110 is slotted to fit over the actuating bar 66 and is held thereon by a cotter pin 112. It will be understood that the springs 64 and 90 tend to raise the actuating bar 66, and thus hold the bearing disc 104 in its groove 106.

A rod 114 is pivotally secured to the end of the arm 110 and has a handle knob 116 secured at its outer end. The rod 114 has a flat portion 118 and two notches 120 and 122 at the end of the flat portion. The rod is guided in a bracket 124 which is riveted to the shelf 20 and has an opening conforming in shape to the cross-sectional area of the rod at the flat portion 118. The rod 114 is pressed downwardly adjacent the bracket 124 by a leaf spring 126, so that when the rod is in either of its extreme positions it will be pressed downwardly to cause interlocking engagement of its notch 120 or notch 122 with the bracket 124.

When the parts are in the positions in which they are illustrated in the drawings (except Fig. 8), the springs are free to transmit sound vibrations from end to end, and the apparatus will operate in a normal manner to transmit and modify vibrations from the electro-mechanical transducer 26 to the pick-up 48. When it is desired to move the apparatus or prepare it for shipment, the knob 116 is raised slightly to disengage its notch 120 from the bracket 124 and pushed inwardly (in the direction of the arrow, Figs. 4 and 7), until the knob 116 abuts the bracket 124. When the knob is released in this position, its notch 122 will be forced into and held in engagement with the bracket 124 by the spring 126. Such movement of the knob 116 will cause the actuating bar 66 to rotate counter-clockwise (Figs. 2 and 3) with consequent movement of the locking plate 52 to the right (Fig. 2) and movement of the locking plate 54 to the left (Fig. 3). As the locking plate 52 moves to the right, the beveled edges surrounding the openings 77 to 81 thereof will engage their respective springs A, C, B1, B2 and D in the manner illustrated in Fig. 8, thus holding the springs to prevent the transmission of forces from a portion of the spring on one side of the locking plate to the portion on the opposite side thereof. Similarly, the locking plate 54 will engage and hold the lower end of spring D.

When it is desired again to condition the apparatus for operation, the knob 116 is raised and pulled outwardly whereupon all the parts will move in directions opposite to those indicated by the arrows, and the locking plates will be disengaged from the springs. In the event that the springs move with the locking plates due to the fact that the locking plates are frictionally wedged between successive coils of the springs, the springs will be freed from the locking plate as the locking plates approach their normal positions due to the abutment of the springs with the edges of the openings in the adjacent shelves.

The springs are entirely clear from contact with parts of the locking means when the latter are in unlocked position, so that there is no possibility of interference with the transmission of sound vibrations through the springs by any parts of the locking means.

Furthermore, because of the beveled edges provided on the locking plates for engagement with the springs, there is no danger of damaging the springs by operation of the locking means even if the parts are not manufactured to very close tolerances. The locking plates, because of their engagement between successive turns of the springs, completely prevent the transmission of forces longitudinally of the springs past the plates at which they are locked. Because of the provision of this locking means. it is possible to assemble the reverberation apparatus completely and ship it to the place where it is to be used, whereas if this locking means were not provided it would be necessary to ship the apparatus in partially assembled condition, and to complete the assembly at the place of use.

While I have shown and described a particular embodiment of my invention it will be apparent to those skilled in the art that numerous modifications and variations may be made in the form and construction thereof, without departing from the more fundamental principles of the invention. I therefore desire, by the following claims, to include within the scope of my invention all such similar and modified forms of the apparatus disclosed, by which substantially the results of the invention may be obtained by substantially the same or equivalent means.

I claim:

1. In a reverberation apparatus having a sound vibration transmitting coil spring, a rigid frame and relatively fragile means for supporting said spring in said rigid frame, the combination of an element rigid with respect to said frame and having a portion adjacent the end of said spring near said fragile supporting means, and a manually operable locking element movable toward said rigid element and having a sharp edge engageable between successive turns of said spring.

2. In a reverberation apparatus, the combination of a frame having a plurality of apertured transverse plates, a sound vibration transmitting spring extending through an aperture in one of said plates, relatively fragile means supporting said spring, and manually operable locking means mounted on one of said plates and engageable with said spring near its supporting means to prevent transmission of forces of destructive magnitude to said supporting means.

3. In a reverberation apparatus, the combination of a relatively long coil spring, a rigid framework, relatively fragile means connecting said spring to said framework for supporting the former, and manually operated means carried by said rigid framework for locking a portion of said spring adjacent said fragile means to said framework, thereby to prevent transmission of appreciable forces from said spring to said fragile means.

4. In a reverberation device comprising a rigid frame having a plurality of apertured horizontal shelves and a sound transmitting coil spring extending through the apertures in said shelves, the combination of a locking plate movably mounted on one of said shelves, said plate having an opening normally in substantial registration with an aperture in the adjacent shelf through which said spring extends, and means to move said locking plate relative to said shelf, thereby locking said coil spring between the edge of the aperture in said shelf and the edge of the opening in said locking plate.

5. In a reverberation apparatus, the combination of a frame having a plurality of apertured transverse plates, a sound vibration transmitting spring extending through apertures in said plates, relatively fragile means secured to the ends of said spring respectively, and manually operable locking elements engageable respectively with said spring near its ends to prevent transmission of forces of destructive magnitude from said spring to said fragile means.

6. In a reverberation apparatus, the combination of a relatively long coil spring, a rigid framework, relatively fragile means connecting said spring to said framework for supporting the former, and a manually operated mechanism for locking the end of said spring adjacent said fragile means to said framework thereby to prevent transmission of appreciable forces from said spring to said fragile means, said manually operated locking mechanism having latching means associated therewith selectively to latch it in locked or unlocked position.

7. In a reverberation device comprising a rigid frame having a plurality of apertured horizontal shelves and a sound transmitting coil spring extending through the apertures in said shelves, the combination of a pair of locking plates, said plates having openings normally in substantial registration with the apertures in said shelves through which the ends of said spring extend, and means to move said locking plates relative to said shelves, thereby locking the ends of said coil spring between the edges of the apertures in said shelf and the edges of the openings in said locking plates.

8. In a reverberation apparatus, the combination of an elongated frame, a sound vibration transmitting coil spring extending longitudinally of said frame, relatively fragile means carried by said frame and supporting said spring, and manually operable locking means engageable with said spring near its supporting means to prevent transmission of forces of destructive magnitude to said supporting means, said locking means including a wedge-shaped part for engagement between successive turns of said coil spring.

9. In a reverberation apparatus, the combination of a relatively long coil spring, a rigid framework, fragile means connecting said spring to said framework for supporting the former, manually operated means carried by said framework for locking the end of said spring adjacent said fragile means to said framework thereby to prevent transmission of appreciable forces from said spring to said fragile means, said locking means including a locking part engageable between successive turns of said spring, and means to hold said locking means selectively in locking or unlocking position.

LAURENS HAMMOND.